Patented Apr. 29, 1924.

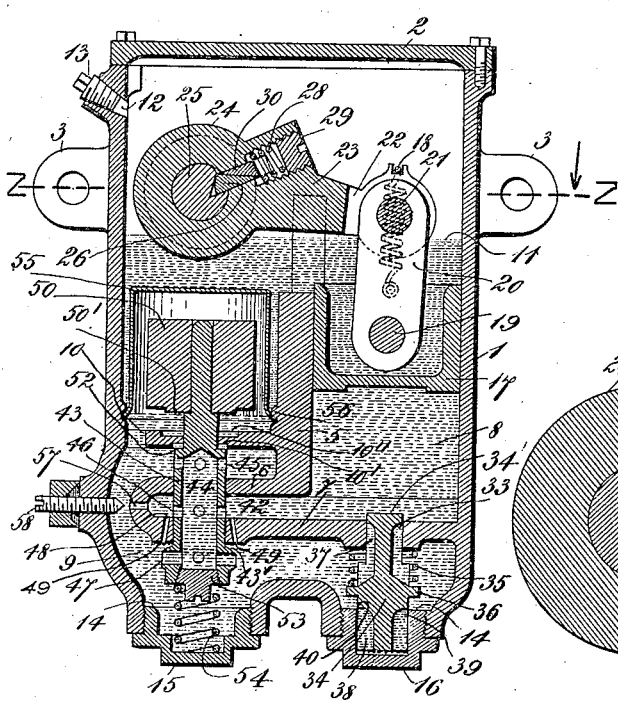

1,492,330

UNITED STATES PATENT OFFICE.

JAMES S. LANG, OF WATERTOWN, MASSACHUSETTS.

SHOCK ABSORBER.

Application filed August 10, 1922. Serial No. 580,827.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention relates to that class of shock absorbers which are especially adapted for motor vehicles and in which the force required to pass a fluid through a constricted opening is utilized to prevent excessive vibration or rebound.

The object of the invention is to provide a generally improved shock absorber embodying means for automatically varying the area of the opening or passages through which the fluid is forced, and therefore the amount of force brought into play whenever such variation in the amount of force is required to effectually check the vibration or rebound of the vehicle body. It is also my object to provide a shock absorber having extreme sensitiveness and of relatively few and accessible parts, and one which will operate satisfactorily even though the viscosity of the fluid used is materially altered by a wide range of temperature to which the absorber may be subjected.

The invention can best be seen and understood by reference to the drawings in which an absorber embodying the invention is shown, and in which—

Figure 1 is a medial vertical cross section.

Fig. 2 is a horizontal section on the line 2—2 of Fig. 1, and

Fig. 3 is a vertical section on a larger scale showing certain parts shown in Fig. 1.

Fig. 4 is a vertical section of a detail of construction to which special reference will later be made.

Referring to the drawings:—

1 represents a casing having a removable cover 2. Projecting laterally from the casing are lugs or ears 3 by which it may be secured to the body or framework of a vehicle. On the inside the casing is provided with spaced bearings 4 for a rock shaft later to be referred to. The interior of the casing is also provided with various members or partitions 5, 6, 7, respectively, which provide within it a compression chamber 8, and outside this chamber immediately adjacent thereto a secondary or expansion chamber 9, with openings between the two chambers, certain of the partitions assisting in the valvular control of said openings.

There is also provided a bridging member 10 acting as a support and stop for a valve later to be mentioned.

The casing forms a receptacle for oil or other suitable fluid contained within its respective chambers and maintained within the casing at about the level indicated at 11. The oil or other fluid is introduced into the casing at the top by way of the inlet 12, closed by the filling plug 13. At the bottom the casing is provided with outlet openings 14 closed by the plugs 15 and 16. These openings provide outlets for the oil and also openings through which the parts above may be machined and through which certain of the working parts may be introduced into the casing.

The compression chamber 8 is within a cylinder formed by the co-operation of the wall or partition 5 with the walls of the casing. Contained to reciprocate within the cylinder is a piston 17. The piston is provided with interior cheeks 18 within which a pin 19 is fixed to cross the space between the cheeks. Pivotally secured to the pin is a link 20 which is also pivotally secured to the pin 21 fixed in the spaced ends 22 of a rocker arm 23.

The rocker arm 23 is provided with a hub 24 secured to a rock shaft 25, which turns within the spaced bearings 4 in the casing above referred to. The hub 24 is held in relation to the shaft 25 by means of a key 26 engaging a key-seat 27 formed in the shaft 25. The key 26 is held in firm engagement with the key-seat 27 by the pressure of the spring 28 transmitted by means of the adjusting wedge 30, the spring 28 being held in place by the tension plug 29. Due to the heavy pressure with which the key 26 is held to the key-seat 27 the hub 24 will bear a fixed relation to the shaft 25 when subjected to a moderate stress. If, however, the pressure of the key-seat upon the key 26 is sufficient when transmitted through the adjusting wedge 30 to compress the spring 28, the key 26 will move back into the keyway in the hub 24 which is sufficiently deep for the purpose and thus allow a relative movement between the shaft 25 and the hub 24. This relative movement may occur in the normal use of the absorber when the viscosity of the oil used is changed by excessive cold or in unusual shocks in which the piston 17 strikes the bottom of the cylinder. It is to be noted that the tension of the spring 28 not only keeps the key 26 in close engagement with the keyseat 27, but also by means of the wedge 30 takes up all looseness due to the wear of the sides of the keyway in the hub 24 preventing play or rattling.

When the hub is displaced from its normal position on account of heavy stress, the normal position is immediately regained upon the removal of the stress by reason of the inclination of the bearing surface of the key-seat 27. The bearing surface of key 26, which remains in contact with the keyseat in shaft 25 when the hub is displaced from normal position, is preferably made convex, as is also the corresponding surface of the key-seat in the shaft 25. The effect of these contours will be that at extreme displacement the tangent of the contact curve will form a greater angle with the radius of contact of shaft 25 than when in normal position, which permits a more uniform force to displace the key throughout its range of movement.

Either keyed upon the outer end of the shaft 25 or constructed integrally therewith is an external rocker arm 31 provided with a ball 32 for making a ball and socket connection with any suitable means (not shown) for connecting it to the axle of the vehicle.

With this arrangement of parts it will be seen that any change in the relative positions of the axle and vehicle frame or body due to inequalities in the roadway will act to move the piston 17, which is raised or lowered in the cylinder as the case may be.

Referring now to the means for controlling the passage of oil between the compression chamber 8 and the secondary or expansion chamber 9: The wall or partition 7 in the casing extends beneath the cylinder containing the pressure chamber and forms the bottom wall of this chamber. Within the partition 7 at the lower end of the cylinder is located an opening or port 33 between the compression chamber and the secondary chamber which, as shown in Fig. 1, extends beneath the compression chamber.

This opening 33 is controlled by a valve 34 which permits of a relatively free flow of oil from the secondary chamber into the cylinder when the piston is raised, but prevents the passage of oil through the opening when the piston moves in a reverse direction. It is not only desirable to be able to remove the valve 34 without removing the piston but also that the valve be slightly cushioned in closing to avoid noise and a valve of such character is shown.

The head 34' of the valve 34 when in the position shown completely closes the opening 33 in the partition 7. The valve is normally held closed by a light spring 35 interposed between the shoulder 36 on the body of the valve and the lower side of the partition 7. When the valve has passed its closed position the lower end of its body will rest against the inside of the plug 16 which forms a stop for limiting its downward movement. Below its head the valve body is provided with guiding fins 37 which engage the interior of the wall around the opening 33. The valve body is also provided with guiding fins 38 which engage the interior of the plug 16 which is bored to receive them. When the valve is raised due to an excess of pressure in the chamber 9 over that in chamber 8 a passageway for the transfer of oil is open alongside the guiding fins 37 to the chamber above. When the pressure of oil in the two chambers becomes equal the spring 35 will close the valve. When the valve is open the oil in the cavity of the plug 16 is in free communication with the chamber 9 by way of the passages between the guiding fins 38 on the lower end of the valve body. Just above these fins is a shoulder 40 on the valve body which co-operates with the upper end of the plug 16 to form a valve edge cutting off the escape of oil from the chamber of the plug when the valve closes, thereby cushioning the impact of the lower end of the valve body against the plug.

The partitions 6 and 7 co-operate with one another to form an extension passage 42 from the lower end of the compression chamber. The bridging support 10 and the partitions 6 and 7 are bored to provide an outlet from the compression chamber by way of openings 42', 42" oppositely arranged and which receive with a sliding fit a cylindrical valve 43, the bore of partitions 6 and 7 around the openings 42', 42" therein forming a valve seating.

In its preferred form as shown in Fig. 1, the valve 43 is provided with a hollow cylindrical space 44 forming a passageway for the transference of liquid from the compression space to the secondary chamber and vice versa. Ports 45, 46 and 47 are bored through the cylindrical walls of the valve. By means of these ports the passage of fluid is controlled as movement of the valve takes place. In order that the valve may be free from friction and in perfect balance the ports 45, 46 and 47 are spaced equally around the circumference of the valve. In its normal position as shown in Fig. 1, there is free communication between the compression space 8 and the secondary chamber 9 by way of the wide open ports 46, the interior space 44, and the ports 45 and 47. When the fluid passes from the compression space 8 to the secondary chamber, entering the valve through ports 46, its path is divided in the valve space 44, one portion passing out by way of ports 45 and the other by way of ports 47. The edge 48 of the valve seating at the upper surface of partition 7 forms a working edge in connection with the ports 46, closing the latter when the valve is depressed and opening them when the valve is raised.

The point of greatest resistance to the flow of fluid through the valve is preferably at the ports 46, determined by the closing edge 48, and therefore the area of ports 46 is made smaller than the aggregate area of ports 45 and 47. Ports 45 and 47 are made of such sizes and angles that their capacities for the discharge of fluid under the same pressures are substantially equal, and the reactive effect of the discharge of fluid from both series of ports is to neutralize each other. The valve being unaffected by the flow of fluid through it will be in perfect dynamic and static balance.

On two opposite sides of the valve seating the partition 7 is bored to form jet passages 49 inclined with reference to the axis of the valve. Directly above ports 47 the diameter of valve 43 is enlarged forming a circular shoulder or vane 43' upon which the discharge from the jet passages 49 may impinge while the valve is in its extreme upper position. On account of the inclination of the jet passages 49 to the axis of the valve, the shoulder or vane at ports 47 moves out of the line and influence of the jets as the valve is depressed and that influence disappears before the ports 46 are fully closed.

The valve is extended at its upper end to form a spindle which is shouldered to receive a weight 50 which is carried thereby. In order to introduce the weight into the casing, the latter is provided with an opening in one side sufficiently large for the purpose normally covered by the cover plate 51, after which the valve is inserted from below through the opening 14.

At the lower end of the valve the cavity 44 is closed with a taper plug 53 which is also adapted to receive the end of a supporting spring 54. The lower end of the spring 54 is retained in a suitable socket formed in the closing plug 15, thereby supporting the valve and its attached weight in its normal position as shown. The valve and its attached weight, supported in a state of balance upon its supporting spring 54, is free to move in a vertical direction in response to such forces as may be brought to bear upon it. A stop to limit the upward movement of the valve after it has passed its full open position is formed by the shoulder 52 coming into contact with the bridging support 10. A stop is also provided to limit the downward movement of the valve after it has passed its closed position, by the weight 50 coming into contact with the upper side of the bridging support 10.

In order to prevent objectionable rebound of the valve during its operation, provision is made for the retention of a film of oil between the striking surfaces. To this end the under side of the support 10 is provided with a counterbore 10' into which the shoulder 52 of the valve will snugly fit, and the upper side of support 10 is provided with a counterbore 10'' into which a shoulder 50' in the lower part of the weight 50 will snugly fit. In operation the shoulders 50' and 52 will enter the respective counterbores prepared to receive them and cushion against the oil imprisoned therein without objectionable rebound.

The object of the weight 50 is to make use of its inertia in the operation of the valve 43 and the inertia is a function of its weight or mass. If the weight 50 is immersed in the oil contained in the casing it loses in weight an amount equal to the weight of the fluid displaced, and its action is interfered with by reason of the inertia of the surrounding fluid. I therefore provide an air chamber 55 within which the weight may freely move without loss of effective weight or interference of surrounding fluid. I prefer to make the air chamber in the form of an inverted airtight metal cup with a slightly flaring edge. The air chamber is introduced into the casing with the weight within it through the opening in the side of the casing before mentioned and is held in proper position by recesses 56 on the inside of the casing engaging its lower flaring edge.

In addition to the passages 46, 45, 47 and 49 there is also provided a by pass 57 which may be adjusted to meet the requirements of vehicles of different weights by means of the needle valve 58. The fluid is able to pass from the compression space 8 through the bypass 57 without interference of the valve 43 since the passage 42 is wider than the diameter of the valve 43, thus permitting a free passage around it.

Reference will now be made to the effect of movement of the piston 17 upon the valve 43.

As before intimated, the valve when unaffected by other forces takes its position as shown in Fig. 1 in a state of suspensional balance upon its supporting spring 54, in which position all its ports are open. It will now be assumed that the piston 17 is moved downward in the chamber 8 resulting in an excess of pressure in chamber 8 over that in the auxiliary chamber 9. This will cause a flow of the fluid through ports 46, dividing in cavity 44 and escaping by way of ports 45 and 47. This flow of the fluid will not, however, influence the movement of the valve as the reactive effects of both ports 45 and 47 neutralize each other, being equal and opposite in direction. A flow will also take place through the jet passages 49 which will impinge upon the edge of the shoulder of the valve directly above ports 47, and by its impact will slightly depress the valve, overcoming the tension of the spring 54. As the depression of the valve continues its shoulder is carried farther from the influence of the jet when no further depression will take place, the valve coming to rest in a partially closed position with the influence of the jet holding the supporting spring in its new state of compression. If the valve is depressed by other means below the point just indicated, while the flow continues the spring 54 wil be further compressed and upon the removal of the depressing cause it will be returned to its former position as the spring overcomes the inertia of the weight 50, and upon the cessation of the flow through the jet passages 49 will return to the normal position shown in Fig. 1.

It is thus seen that the flow of liquid through the jet passages 49 tends to move the valve 43 from its normal wide open position to one more nearly closed, from which it may readily be either completely closed or widely opened.

The flow of liquid affecting the valve in the above manner is brought about by the movement of the piston 17 which by suitable means is connected with the vehicle axle. In this manner the movement of the vehicle axle is utilized to aid or supplement the action of the weight 50, and to whatever extent may be desired, by a proper proportioning of the parts.

Having described the effect upon the valve 43 of the fluid passing through the jet passages, reference will now be made to the function of the weight 50 and its attached valve, without reference to the effect of the flow of liquid through the jet passages already described.

The weight 50 and the attached valve 43 may be considered as one with reference to the effects of their inertia. The weight 50 and valve 43 in normal position are supported by the spring 54 in static balance as shown in Fig. 1 or if desired with the valve shoulder 52 resting against the stop on the under side of bridging support 10. If depressed from this position and state the spring 54 will be compressed and upon release will return to its original position as the inertia of the weight and valve is overcome by the spring. If now the absorber casing 1 carrying the supporting bridge 10, partitions 6 and 7, together with the spring-supporting plug 16, be suddenly raised, the inertia of the weight, due to its considerable mass, will tend to cause it to lag behind the rise of the casing, compressing the spring 54 and resulting in a relative movement between the casing and the valve. This relative movement if sufficiently great will close the ports 46. If the upward movement of the casing is not acceleratingly continued the compressed spring 54 will in turn overcome the inertia of the weight and valve which overtaking the casing will regain its original position re-opening the ports 46.

The operation of the absorber is as follows:

It will be assumed that all the parts of the shock absorber are in normal position with ports 46 open, the piston occupying a position about midway of the cylinder, and that the vehicle with its axle in normal relation to the body encounters a road surface having a large number of small inequalities, not in themselves sufficient to cause a rebound. In passing over these inequalities the axle is rapidly vibrated up and down as it follows the contour of the ground, with a small range of movement. The rocker arm 23 and piston with it have a corresponding movement. Due to the fact that the flow of liquid through the jet passages 49 is rapidly intermittent and to a slight extent reversed in direction on account of lack of pressure in the compression chamber on the upward stroke of the piston, the comparatively heavy weight 50 is only slightly influenced by the jet and remains only very slightly depressed and the valve remains nearly wide open, permitting a relatively free communication between the compression chamber 8 and the secondary chamber 9. This permits a free vibration of the piston without interfering with the resiliency of the springs.

It will now be assumed that the vehicle encounters a raised obstruction in the roadway having an abrupt rise succeeded by a corresponding decline and of sufficient height and width under ordinary circumstances to produce a violent rebound. The vehicle and shock absorber with it reaches the obstruction with all its parts as before in substantially normal positions, and as the wheels mount the rise the axle is brought nearer to the body of the vehicle compressing the vehicle springs. Simultaneously with the rise of the axle the hub 24 is turned lifting the rocker arm 23 which raises the piston in the cylinder, and oil is drawn into the compression chamber below the piston from the secondary chamber by way of the check valve 34, the ports in the valve 43, the jet passages 49 and the bypass 57. If, as assumed above, the approach is quite abrupt followed by an immediate decline, the inertia of the vehicle body will prevent an appreciable rise of the vehicle body until the wheels have reached the top of the obstruction when an incipient rebound will begin. The vehicle body then rises slightly from its line of travel and simultaneously the axle begins to move away from the body as the wheels pass the horizontal crown, moving the piston downward in the cylinder and discharging fluid through the valve ports 46, the bypass 57 and the jet passages 49. As heretofore explained, the discharge of fluid through the jet passages impinging on the edge of the circular vane on the body of the valve tends to depress it. On this tendency of the valve to close, due to the impulse of the fluid jet, there is superposed a force also tending to close it due to the inertia of the weight 50 in conjunction with the slight rise of the vehicle body in passing the obstruction. The effect of the two forces mentioned will quickly and completely close the valve port 46 preventing any flow of oil through the valve. As the wheels pass over the crown of the rise therefore the vehicle springs will be held in a state of compression and rebound prevented, as the oil can only slowly escape from the compression chamber by way of the jet passages 49 and bypass 57. As the wheels descend on the further side of the obstruction the weighted valve tends to regain its first position and the port 46 is partially opened. As the opening of the valve continues the circular vane is brought more and more into the influence of the jets issuing from jet passages 49, tending to slow up its return and easing the impact of the valve against its upper stop.

A case the opposite to the preceding will now be considered, in which the vehicle passes a wide and deep depression in the roadway.

The vehicle and shock absorber with it approaches as before with all its parts in substantially normal positions. Due to the inertia of the vehicle body, when the wheels go into the depression, the axle moves down and away from the vehicle body. As this movement takes place the piston moves downward in the cylinder, the fluid passing out through ports 46, jet passages 49 and bypass 57. The discharge from the jet passages 49 tends to depress the valve as before shown. This action is, however, opposed by the inertia of the weight 50, due to the slight fall of the vehicle body, with the result that the ports 46 remain nearly wide open, permitting the fluid to pass with little resistance into the secondary chamber. Due to the fact that the resistance to flow is slight, the piston moves downward with comparative freedom allowing the vehicle springs to expand beyond their normal state of compression, thus maintaining the vehicle body at nearly its former level. As the wheels pass the bottom of the hollow, the ports 46 are wide open and the vehicle springs remaining expanded maintain the vehicle body well up in position and the flow of fluid through the valve ceases. The wheels now strike the rise on the opposite side of the hollow and the piston regains its normal position in the cylinder, and the action in passing the top of the upward incline onto the level roadway beyond resembles somewhat that taking place in the case of the raised obstruction previously described.

In general terms then, the movement of the axle of the vehicle tends, by means of the liquid pressure brought about, to move the valve toward a position from which it may readily be closed or opened, and with the co-operation of the inertia of the weighted valve will close the said valve, but will not close it when opposed by such inertia.

The means shown are preferred in the sense that they are considered best fitted for accomplishing the purposes of the invention, although it is obvious that they may well be varied without departing from the spirit of the invention.

Having thus fully described my invention, I claim and desire to secure by Letters Patent of the United States:

1. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a weighted valve controlling said outlet, means for yieldingly supporting said valve in a normally open position, and means whereby the fluid will be directed to impinge upon said valve and assist in the closure thereof when the fluid is compressed in the pressure chamber by said piston.

2. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a weighted valve controlling said outlet, means for yieldingly supporting said valve in a normally open position whereby the weighted valve will assist in the control of said outlet by its own inertia, and means whereby the fluid will be directed to impinge upon said valve for assisting in the closure thereof when the fluid is compressed in the pressure chamber by said piston.

3. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a weighted valve controlling said outlet, means for yieldingly supporting said valve in a normally open position whereby the weighted valve will be assisted in the control of said outlet by its own inertia, and means whereby the fluid will be directed to impinge upon said valve for moving it into a more nearly closed position when the fluid is compressed in the pressure chamber by said piston.

4. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a weighted valve controlling said outlet, said valve being adapted and arranged whereby the fluid out of said pressure chamber when compressed by the piston will be directed to pass through said outlet in the opposite directions when the valve is open, means for yieldingly supporting the valve in a normally open position, and means whereby the fluid will be directed to impinge upon said valve and assist in the closure thereof when the fluid is compressed in the pressure chamber by said piston.

5. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a hollow weighted valve controlling said outlet, said valve having an interior space with openings into and out of said space arranged whereby fluid entering the valve space from the pressure chamber when compressed by the piston will flow through the valve space in opposite directions when the valve is open, means for yieldingly supporting said valve in a normally open position whereby the weighted valve will assist in the control of said outlet by its own inertia, and means whereby the fluid will be directed to impinge upon said valve for moving it into a more nearly closed position when the fluid is compressed in the pressure chamber by the piston.

6. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a valve for controlling said outlet, said valve having an attached weight whereby it will be assisted in the control of said outlet by the inertia of said weight, means for yieldingly supporting said valve, and means for isolating said weight from the contained fluid.

7. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a valve for controlling said outlet, said valve having an attached weight whereby it will be assisted in the control of said outlet by the inertia of said weight, means for yieldingly supporting said valve, and a casing providing an air chamber within it in which said weight will freely move.

8. A fluid check shock absorber for controlling the movement of relatively movable parts comprising an element attachable to one of said parts and having a pressure chamber, said element being provided also with means permitting being provided also with means permitting of the circulation of a fluid into and out of said chamber and consisting in part of a controllable outlet, a piston attachable to the other of said parts and reciprocable in said pressure chamber, a valve for controlling said outlet, means for yieldingly supporting said valve, a stop for limiting the movement of the valve, and means for pocketing a portion of the contained fluid to form a cushion between the valve and said stop.

9. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a valve having an attached weight for controlling said outlet, means for yieldingly supporting the valve, a stop for limiting the movement of the valve and attached weight by contact of the weight with said stop, and means for pocketing a portion of the contained fluid to form a cushion between the weight and said stop.

10. A fluid check shock absorber comprising in part a casing having within it interior walls co-operating with the casing to form therein a fluid containing pressure chamber and a secondary chamber with a port between said chambers, said casing having also an opening therein in line with said port, a plug closing said opening in the casing, an inwardly opening valve for controlling said port insertable within the casing through the opening therein closed by said plug, said valve having a head movable into and out of said port, a body fitting slidably within said plug, and means for limiting the opening of said valve.

11. A fluid check shock absorber comprising in part a casing having within it a fluid containing pressure chamber and a secondary chamber with an opening between said chambers, an inwardly opening valve for controlling said opening between the chambers, a stop limiting and defining the closed position of said valve, and means whereby said valve will cushion against a portion of the contained fluid for lessening the impact of the valve against said stop.

12. A fluid check shock absorber comprising in part a casing having within it interior walls co-operating with the casing to form therein a fluid containing pressure chamber and a secondary chamber with a port between the chambers, said casing having also an opening therein in line with said port, a hollow fluid containing plug closing said opening in the casing, an inwardly opening valve for controlling said port, and insertable within the casing through the opening therein closed by the plug, said valve having a head movable into and out of said port, a winged body to the valve fitting slidably within said plug with the end thereof engaging said plug when the valve is occupying a closed position, a shoulder on said valve co-operating with said plug in manner whereby it will cushion against the fluid contained within said plug when the valve is closed for lessening the impact of the end of the valve against said plug.

13. A fluid check shock absorber for controlling the movement of relatively movable parts, comprising an element attachable to one of said parts and having a pressure chamber, said element being provided also with means permitting of the circulation of a fluid into and out of said chamber and consisting in part of a controllable outlet, a valvular mechanism for controlling said outlet, a piston attachable to the other of said parts and reciprocable in said pressure chamber, a flexible mechanism connecting said piston with said other of the parts and having within it a rock shaft and rocker arm, and a combined spring pressed key and adjusting wedge connecting the rocker arm to said shaft.

14. A fluid check shock absorber for controlling the movement of relatively movable parts, comprising an element adjustable to one of said parts and having a pressure chamber, said element being provided also with means permitting of the circulation of a fluid into and out of said chamber and consisting in part of a controllable outlet, a valvular mechanism for controlling said outlet, a piston attachable to the other of said parts and reciprocable in said pressure chamber, a flexible mechanism connecting said piston with said other of the parts and having a rocker arm and a rock shaft to which said arm is connected, said shaft having a key seat within it, and a spring pressed key connecting the rocker arm to said shaft and fitting within said key seat, the engaging surfaces of said key seat being convex, substantially as described.

15. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a valvular member controlling said outlet, said valvular member being adapted and arranged whereby the fluid out of said pressure chamber when compressed by the piston will be directed to pass through said outlet in opposite directions when the valvular member is open and in a manner whereby the member will be unaffected by the passage of fluid through said outlet.

JAMES S. LANG.